United States Patent [19]

Takada

[11] Patent Number: 4,872,602

[45] Date of Patent: Oct. 10, 1989

[54] GUIDE DEVICE FOR THE DRIVE TAPE OF AN AUTOMATIC SEAT BELT SYSTEM

[76] Inventor: Juichiro, Takada 12-1 Shinmachi 3-chome, Setagaya-ku, Tokyo, Japan

[21] Appl. No.: 159,313

[22] Filed: Feb. 23, 1988

[30] Foreign Application Priority Data

Feb. 23, 1987 [JP]  Japan ................................. 62-039675

[51] Int. Cl.⁴ ............................................ B65H 23/04
[52] U.S. Cl. ...................................... 226/196; 242/76; 280/804
[58] Field of Search ...................... 242/75.45, 67.5, 76; 280/801, 802, 803, 804; 226/196; 74/501 R; 384/49, 42, 37, 10

[56] References Cited

U.S. PATENT DOCUMENTS

| | | | |
|---|---|---|---|
| 2,694,130 | 11/1954 | Howard | 226/196 X |
| 3,401,859 | 9/1968 | Rienks et al. | 226/196 |
| 4,498,690 | 2/1985 | Takada | 242/75.45 X |
| 4,580,813 | 4/1986 | Hashimoto | 280/804 |

*Primary Examiner*—Stanley N. Gilreath
*Attorney, Agent, or Firm*—Brumbaugh, Graves, Donohue & Raymond

[57] ABSTRACT

A drive device for a vehicle automatic seat belt system in which a drive tape is slidably received within a cylindrical casing comprises buckling-prevention members between the tape and the opposite walls of the casing on either side of the tape. The members are adapted to maintain the tape axis aligned with the casing axis and also to rotate about the axis of the casing so that the tape can twist.

4 Claims, 3 Drawing Sheets

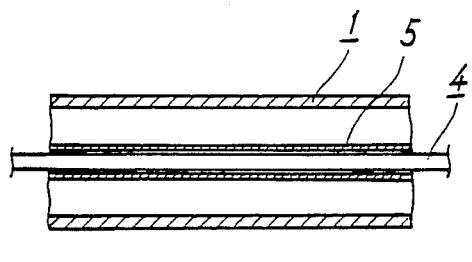
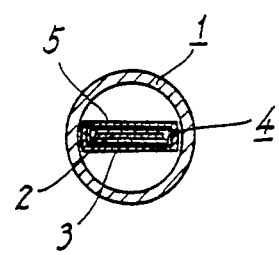
FIG. 7A    FIG. 7B
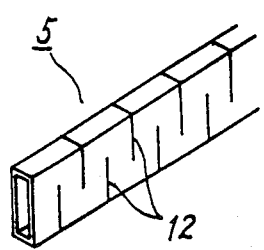
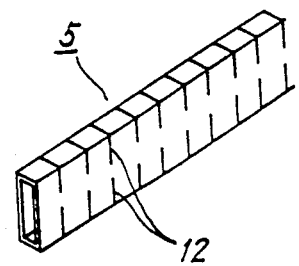
FIG. 8A    FIG. 8B

GUIDE DEVICE FOR THE DRIVE TAPE OF AN AUTOMATIC SEAT BELT SYSTEM

BACKGROUND OF THE INVENTION

The present invention relates to the driving mechanism of an automatic seat belt system and in particular to a drive device of the type that employs a drive tape.

In many specific forms of known automatic seat belt systems (also sometimes called passive seat belt systems) the upper outboard end of a shoulder belt is moved along a guide rail installed along the edge of the vehicle roof between a rearward position in which the belt extends across the vehicle occupant's torso in a restraining configuration and a forward position in which the belt is located away from the occupant to enable him or her to enter or leave the vehicle. In a known form of drive device for automatic seat belt systems, a thin drive tape, such as a metal strip coated with a flexible polymeric material, is driven by a motor-driven drive mechanism installed at a suitable location remote from the guide rail. The drive tape is guided from the drive mechanism to the rearward end of the guide rail by a cylindrical casing. The guide rail itself includes a guideway for the drive tape that maintains it in position within the guide rail. An example of an automatic seat belt system of the type to which the present invention relates is found in the present applicant's U.S. Pat. No. 4,498,690 issued Feb. 12, 1985.

It is advantageous for the portion of the drive tape that moves along the guide rail to be positioned flatwise with respect to the edge of the vehicle roof, thereby to minimize the projection of the guide rail from the roof into the passenger compartment. On the other hand it is desirable for the drive device, which includes a drive sprocket or reel, to be arranged such that the sprocket or reel lies flatwise to the side of the vehicle, again to minimize the widthwise dimension of the space for the drive device. The orientation of the drive sprocket or reel for the tapes means that the tape lies edgewise of the side of the vehicle. Accordingly, the drive tape undergoes a twist along the path between the drive device and the guide rail. Moreover, the casing is not straight, so the tape twists along the path through the casing. For this reason it is common to provide a cylindrical tubular casing between the drive device and the guide rail in order to constrain the tape to move along the prescribed path and distance and at the same time to permit it to twist. In order to minimize the frictional resistance to movement of the tape through the casing, it is necessary to leave a clearance between the edges of the tape and the walls of the casing. In other words the diameter of the casing is slightly larger than the width of the tape. The provision of such a clearance, however, does not entirely solve the problem of high resistance to movement of the tape through the casing, inasmuch as the tape tends assume a zig-zag or tortuous path along the casing when it is driven in a direction to push the belt transfer anchor along the guide rail from the rearward, restraining position to the forward, releasing position. The zig-zag path of the belt along the casing increases the frictional resistance to the movement of the tape and also produces a bothersome noise as the configuration of the buckles and twists along the tape change in the course of its movement.

One solution to the problems with cylindrical casings has been to provide a premolded casing arranged to conform to the desired path between the drive device and guide rail. Such premolded casings eliminate the play in the drive tape and also eliminate the noise problem. On the other hand, the resistance to sliding of the tape member along the molded casing increases considerably, thus requiring that the power of the drive motor be correspondingly increased. The greater forces involved in the system can also result in breakage of the tape.

SUMMARY OF THE INVENTION

An object of the present invention is to provide an improved arrangement for the guiding of a belt transfer tape along the portion of its path between the drive device and the guide rail. In particular, one aspect of the object of the invention is to prevent the tape from buckling within a cylindrical casing without significantly increasing the frictional resistance to movement of the tape. Another aspect of the invention is to enable the drive tape to twist along the length of the casing and facilitate desirable orientations of the drive sprocket or drive reel, on the one hand, and the orientation of the tape along the guide rail, on the other, as well as allow conformity of the tape to the non-linear path of the casing.

There is provided, in accordance with the present invention, an improvement in a drive device for a vehicle automatic seat belt system in which a drive tape is slidably received with clearance within a cylindrical casing. In particular the improvement is the provision of buckling-prevention members received between the tape and each of the opposite walls of the casing on either side of the tape. The members are axially coextensive with the tape and casing and are adapted to move about the axis of the casing such that the tape can twist. At the same time the buckling preventive members are adapted to maintain the axis of the tape substantially aligned with the axis of the casing so that the tape does not buckle.

The buckling-prevention members may be of various forms. In one embodiment the members are a multiplicity of bodies disposed in adjacent relation lengthwise of the casing. Such bodies may include unitary members having portions disposed on opposite sides of the tape and having holes that are disposed lengthwise of the tape and shaped to constrain the tape to move along the axis of the casing and that slidably receive the tape. In one embodiment of such unitary members, the members are discs spaced apart axially along the casing and the bodies further include a multiplicity of ball-like elements filling the spaces on either side of the tape within the casing between the unitary member. In another embodiment the bodies are barrel-shaped and are disposed in end-to-end engagement along the length of the tape.

In another embodiment the bodies are semi-cylinders, there being one group of such semi-cylinders on one side of the tape and a second group of such semi-cylinders on the other side of the tape. The bodies may also be spherical balls arranged in groups on either side of the tape and in engagement with each other along the length of the tape and casing. In still another embodiment the members are wall portions of a flexible rectangular tube received in the casing and receiving the tape. The ends of the wall portions of the tube are in contact with diametrically opposite zones of the casing wall so as to maintain the tube substantially aligned with the casing axis, whereby the tube in turn maintains the tape in axial alignment with the casing. The tube may have a plurality of spaced-apart slits in the opposite walls generally transverse to its longitudinal axis.

For better understanding of the invention reference may be made to the following description of exemplary embodiments, taken in conjunction with the figures of the accompanying drawings.

DESCRIPTION OF THE DRAWINGS

FIGS. 7A and 7B are longitudinal cross-sectional and transverse cross-sectional views, respectively, of a fifth embodiment.

FIGS. 8A and 8B are pictorial views of modifications of the buckling preventive member of the fifth embodiment.

DESCRIPTION OF THE EMBODIMENT

Figure 1:
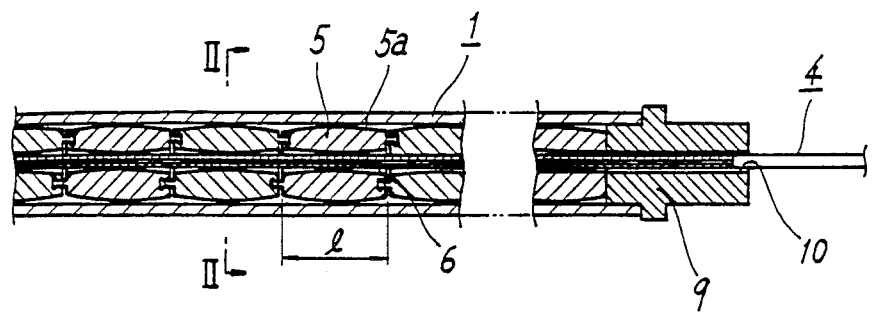
FIG. 1 is a longitudinal cross-sectional view of a first embodiment of the invention.

In all embodiments shown in the drawings, a cylindrical casing receives a drive tape 4, and buckling-prevention members 5 are received between the tape 4 and each of the opposite walls of the casing on either side of the tape. The members 5 are axially coextensive with the tape and casing and are adapted to move by either sliding or rolling about the axis of the casing such that the tape can twist. The members 5 are also adapted to maintain the axis of the tape substantially aligned with the axis of the casing so that the tape does not buckle. In particular, the members 5 of all embodiments are configured in such a way as to be engaged at intervals between the tape and the casing and prevent the tape from buckling due to such engagements. The members do not increase the frictional resistance to movement of the tape as compared to resistance present when the tape is received in the casing without any buckling-prevention members. Furthermore, the movement of the tape back and forth in the casing does not produce any bothersome noise.

Figure 2:
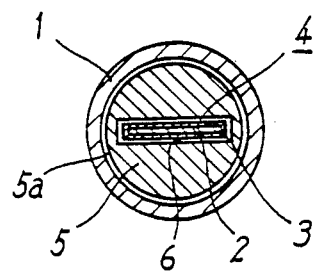
FIG. 2 is a transverse cross-sectional view of the embodiment shown in FIG. 1 taken along the lines 2—2 of FIG. 1 and on a larger scale.
Figure 3:
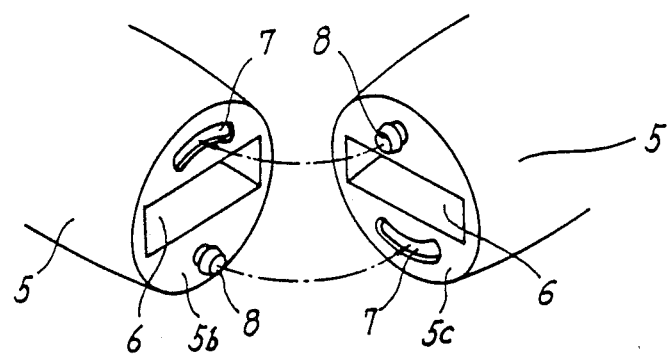
FIG. 3 is a partial pictorial view of a pair of the buckling-preventive members of the first embodiment.

The embodiment of FIGS. 1-3 comprises a casing 1 that is joined at one end by a coupling 9 to a drive mechanism, such as a drive mechanism of the type described and shown in the aforementioned U.S. Pat. No. 4,498,690. The other end of the casing (not shown) is suitably coupled to the rearward end of the guide rail of the belt system (not shown). The drive tape 4 is composed of a thin metal band 2 coated with a suitable polymeric material 3. The drive tape is sufficiently flexible to allow it to be trained along a desired path conforming to the vehicle body from the drive mechanism to the forward end of the guide rail but sufficiently stiff to transmit a pushing force from the drive mechanism to move the belt to the forward release position. The buckling-prevention members 5 are barrel-shaped bodies having diameters slightly less than the internal diameter of the casing 1 so that they rotate within the casing to accommodate twists in the drive tape 4. The barrel shape allows them as a group to conform to the bending of the casing between the drive device and the guide rail, such bending being accommodated by the space 5a between their end portions and the interior wall of the casing. Each member 5 has a rectangular hole 6 arranged axially and, as shown, preferably thinner in thickness in the middle and thicker at each end, also to allow the series of members to accommodate to the bend in the casing and also the minimize frictional contact between the tape and the multiplicity of members 5. Each member has at each end an arcuate groove 7 and a projection 8, the grooves accepting pins 8 on the adjacent members 5 (see FIG. 3). The arcuate grooves allow the pins to move to accommodate a relative twist between adjacent members, as each one rotates slightly relative to those adjacent to it. The members 5 are, preferably, molded from a suitable polymeric material. A desirable length for the members is approximately 15 millimeters.

In assembling the drive, the drive tape may be inserted into a series of the members 5, which are suitably joined to one another by the coupling grooves and pins 7 and 8, and then the members with the tape in place are passed through the casing 1. Alternatively, the members 5 can be connected to one another following which the tape is passed through the holes 6. Next, the casing 1 with the tape and members in place is installed in the car body. One end of the tape (which passes through the hole 10 in the coupling 9) is connected to the tape drive member of the drive mechanism (not shown) and the drive mechanism is coupled to the coupling 9 and installed in the car body. The free end of the drive tape 4 is then guided through the guide rail and connected to the slider for the upper end of the shoulder belt.

When the drive member moves linearly and twists through the casing, each buckling-prevention member 5 rotates through a small angle to accommodate twisting of the tape along its length. Furthermore, the tape 4 is supported within the holes 6 in the members 5, each member 5 in turn being supported by the casing, whereby the tape is maintained with its axis substantially coincident with the axis of the casing 1. In this way the tape is prevented from buckling. The spans between support areas where the tape engages the walls of the holes of the several members is relatively short, such that the stiffness of the tape maintains it substantially straight without contacting the divergent, thicker portions of each hole 6.

Figure 4A:
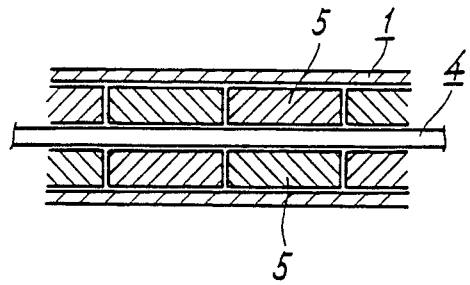
FIGS. 4A and 4B are longitudinal cross-sectional and transverse cross-sectional views, respectively, of a second embodiment.
Figure 4B:
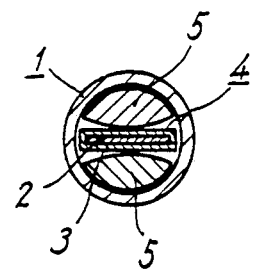

In the embodiment of FIGS. 4A and 4B the buckling-prevention members 5 are generally semi-cylindrical bodies arranged in groups, one group being on one side of the tape 4 and the other group being on the other side of the tape. They are placed end-to-end along the entire length of the casing. Preferably, the members are of a length of about 15 millimeters, but it is within the scope of the invention to use continuous rods of generally semi-cylindrical cross-section running the full length of the casing and produced from a suitable flexible polymeric material.

Figure 5A:
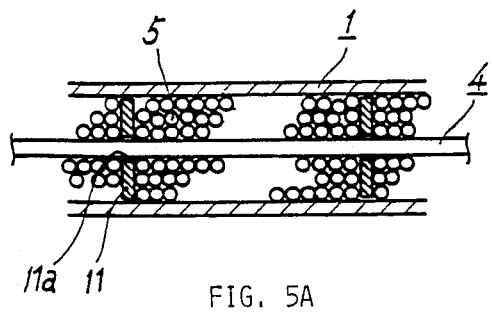
FIGS. 5A and 5B are longitudinal cross-sectional and transverse cross-sectional views, respectively, of a third embodiment.
Figure 5B:
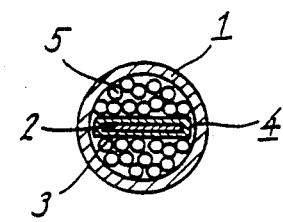
Figure 6A:
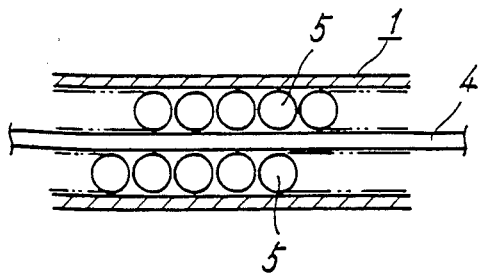
FIGS. 6A and 6B are longitudinal cross-sectional and transverse cross-sectional views, respectively, of a fourth embodiment.
Figure 6B:
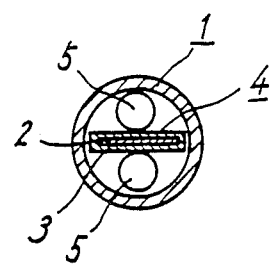

In the embodiment of FIG. 5 the buckling-prevention members 5 comprise a series of spaced-apart circular disks 11 having axial rectangular holes 11a to allow the tape 4 slidably to pass through them and small balls or granules 5 of a suitable material, such as a polymeric material, filling the spaces between the disks 11 and between the tape and the opposite internal walls of the casing 1. The balls or granular elements 5 may be comparatively small, but they should not, of course, be so small that they can pass through the holes 11a in the disks 11. In a similar embodiment, as shown in FIGS. 6A and 6B spherical balls 5 having a diameter slightly less than the maximum clearance between the tape 4 and the internal wall of the casing 1 are arranged end-to-end along the entire length of the casing and the tape. The embodiments of FIGS. 5 and 6 act on similar principles, that of acting like bearings by reducing frictional resistance to movement of the tape 4 by a rolling action.

In the embodiment of FIG. 7 the buckling-preventive members 5 are constituted by the wall portions of a flexible rectangular tube 5 having a width slightly less than the internal diameter of the casing 1 to enable it to twist but also being sufficiently wide to engage the internal walls of the casing at diametrically opposite regions. Such regions of engagement insure that the tube 5 remains substantially coaxial with the casing 1. At the same time, however, the casing can twist along its length to conform to the twist of the drive tape 4. The ability of the tube 5 to twist about the axis of the casing and also to conform to the bend of the casing is increased by forming spaced-apart partial slits in the tube, such as the staggered slits 12 shown in FIG. 8A or the transversely aligned slits 12 shown in FIG. 8B. While it is possible that the slits can weaken the tube such that it may break during its life, any breaks in the tube are of no consequence, inasmuch as the tape itself keeps the segments of the rectangular tube in aligned end-to-end relation.

Thus, there is provided, according to the present invention, an improvement in the drive device that employs a drive tape. According to the invention, the tape is prevented from buckling within the casing, but at the same time the tape is able to twist to confirm to the path of the casing along its length and the orientations of the drive mechanism and the guide rail. The invention eliminates bothersome noise encountered in some prior art devices. It also allows a relatively low-powered drive motor to be used, inasmuch as the frictional resistance to sliding of the tape is not increased and may in fact be reduced, compared to known arrangements.

I claim:

1. In a drive device for a vehicle automatic seat belt system in which a drive tape is slidably received within a cylindrical casing, the improvement wherein buckling-prevention members are received freely between the tape and the wall of the casing, said members being a multiplicity of unitary barrel-shaped bodies disposed in end-to-end engagement along the length of the tape and on opposite sides of the tape, said bodies having holes that are disposed lengthwise of the tape and shaped to constrain the tape to move along the axis of the casing and that slidably receive the tape, and said bodies being axially coextensive with the tape and casing and being displaceable about the axis of the casing to facilitate tape twisting and being engageable at least at intervals with the tape and the casing so as to maintain the axis of the tape substantially aligned with the axis of the casing so that the tape does not buckle.

2. In a drive device for a vehicle automatic seat belt system in which a drive tape is slidably received within a cylindrical casing, the improvement wherein buckling-prevention members are received freely between the tape and the wall of the casing, said members being a multiplicity of semi-cylindrical bodies disposed in adjacent relation lengthwise of the casing, there being one group of such semi-cylindrical bodies on one side of the tape and a second group of such semi-cylindrical bodies on the other side of the tape, and said bodies being axially coextensive with the tape and casing and being displaceable about the axis of the casing to facilitate tape twisting and being engageable at least at intervals with the tape and the casing so as to maintain the axis of the tape substantially aligned with the axis of the casing so that the tape does not buckle.

3. In a drive device for a vehicle automatic seat belt system in which a drive tape is slidably received within a cylindrical casing, the improvement wherein buckling-prevention members are received freely between the tape and the wall of the casing, said members being the wall portions of a flexible rectangular tube received in the casing and receiving the tape, the ends of such wall portions being in contact with the diametrically opposite zones of the casing wall such as to maintain the tube substantially aligned with the casing axis, whereby the tube engages at least at intervals with the tape so as to maintain the axis of the tape substantially aligned with the axis of the casing so that the tape does not buckle, said tube being displaceable about the axis of the casing to facilitate tape twisting.

4. The improvement according to claim 3 wherein the tube has a plurality of spaced-apart slits in its opposite walls generally transverse to its longitudinal axis.

* * * * *